Aug. 26, 1930.   P. HAUSER ET AL   1,774,097
POCKET CINEMATOGRAPH
Filed Sept. 20, 1926
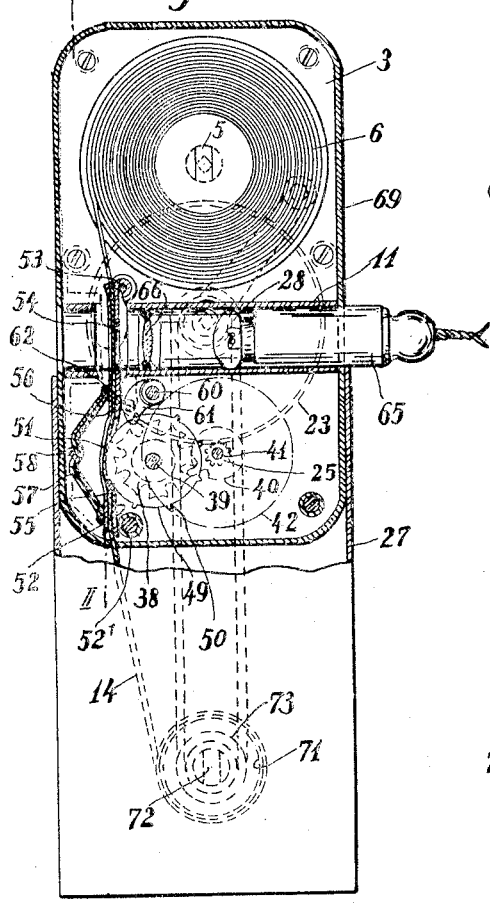
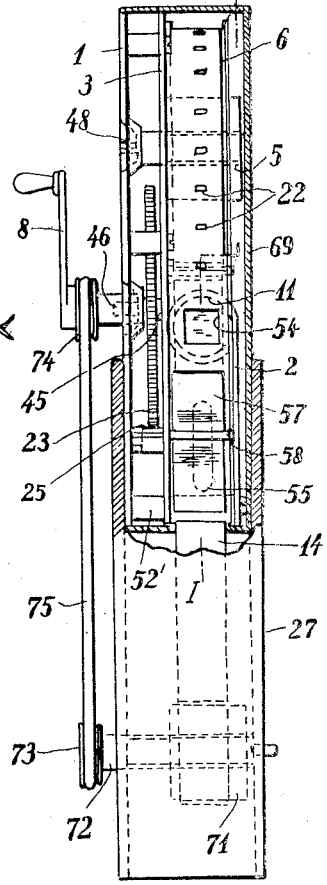
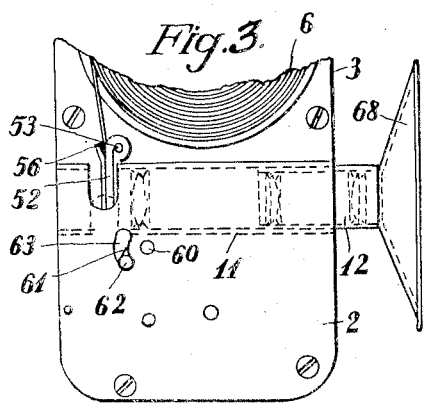
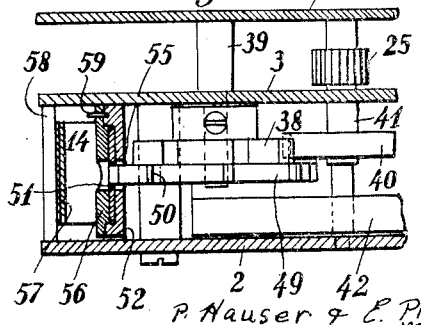
P. Hauser & E. Probst, Inventors
By Marks & Clerk, Attys.

Patented Aug. 26, 1930

1,774,097

UNITED STATES PATENT OFFICE

PHILIPPE HAUSER AND EDUARD PROBST, OF BERNE, SWITZERLAND

POCKET CINEMATOGRAPH

Application filed September 20, 1926, Serial No. 136,636, and in Switzerland October 15, 1925.

The present invention relates to pocket-cinematographs.

Already a while ago people sought to construct cinematographs for individual use as small and cheap as possible and several constructions are known already. But all the apparatus known heretofore were still relatively bulky and required a source of light which rendered the working of the apparatus dependent on a lighting network.

The object of the present invention is a pocket-cinematograph suitable for a waistcoat-pocket thus presenting the advantage that it may be carried along everywhere and may be manufactured at a lower price than any other.

According to the invention this cinematograph comprises, mounted between parallel plates, an axle carrying the film roll and a mechanism adapted to move the film band step by step, film roll and mechanism being located so close up to both sides of a tube arranged perpendicularly to said axle and containing the optics that the dimensions of the whole apparatus may be reduced to a size suiting a waistcoat-pocket.

The invention is clearly illustrated in the accompanying drawings in which similar reference characters designate corresponding parts throughout the several views and in which:

Fig. 1 is a vertical section on line I—I of Fig. 2 of a second working example and in natural size, Fig. 2 is a section on line II—II in Fig. 1, Fig. 3 shows the lower part of the apparatus with a microscope put-in and with a funnel-shaped eye piece for beholding the film by its transparency and Fig. 4 shows on an enlarged scale some details of the mechanism for guiding and moving the film stepwise.

Referring now, more particularly, to the drawings there is provided three plates 1, 2 and 3 secured in spaced parallel relation to each other. An axle 5 carrying the film roll 6 is journalled within the plates 1 and 3 on the one side of a tube 11 containing the optics and arranged perpendicularly to said axle. On the other side of said tube and between the plates 2 and 3 is located the mechanism for moving the film band 14 step by step the upper part of plate 2 being bent so as to form the tube 11. The mechanism for moving the film band is a Maltese gear comprising an eight-toothed star wheel 38 fast to a revolvable axle 39 and cooperating with a single-toothed wheel 40 secured to a revolvable axle 41. To this latter axle is also secured a fly wheel 42 and a pinion 25 of a transmission gear whereof the larger gear wheel 23 is fast to an axle 45 journalled in the plates 1 and 3 and having a squared end 46 for receiving a crank 8. There is likewise a squared end 48 on the axle 5 for the film band. A toothed feed roll 49 is coupled to the star wheel 38 and engages with its teeth 50 the perforations 22 of the film band.

In order to reduce as much as possible the dimensions of the apparatus the axle 5 of the film band and the mechanism for moving the same step by step are located as close up as possible to the tube 11 containing the optics. Also the said mechanism, the tube 11 and the part of the axle carrying the film roll are arranged on one side of plate 3 while the transmission gear 23, 25 is arranged on the other side of the plate thus facilitating the drawing nearer to the tube 11 of the film roll and of the said mechanism.

A longitudinal plate 52 hinged at one end to a pivot 53 and slightly curved at its other end near the feed roll 49 serves as a guide for the film band passing past the optics. This plate 52 has a square opening 54 for the image and a slot 55 for the teeth 50 of the roll 49. A second plate 56 of a similar shape is pressed against said plate 52 by means of flat spring 57 supported by a pin 58 thus pressing plate 52 against a check member 52'. Plate 56 touches plate 52 only along its bent up longitudinal edges (see Fig. 4) thus leaving free between the two plates a flat canal for the film band. A safety pin 59 prevents any displacement of the plate 56 which possesses a similar opening 54 and a slot 55 as have been described for plate 52.

There is also a tappet 61 hinged to a pivot 60 and provided with an adjusting button 62 which extends through a slot 63 Fig. 3 to the outside of plate 2 so as to be reached by hand from the outside. If button 62 is pushed upwards from its lowest position shown in Figs. 1 and 3, the tappet 61 will cause the guide plate 52 to swing on pin 53 until the film band has been withdrawn from the feed roll 49.

It is easily understood that by turning the crank 8 the single tooth wheel 40 of the Maltese gear is turned through the transmission gear 23, 25 and that the star wheel and the feed roll 49 is caused to turn stepwise together with the film band.

If it is desired to project the moved film on a screen an incandescent lamp 28 having a socket 65 connected to a pocket lamp cell is introduced into the tube 11 and the image is directed unto the screen by means of a lens 66.

If the images are to be beheld in day light or in artificial light by looking through tube 11 a microscope 28 as shown in Fig. 3 is inserted into the tube 11 and a funnel-shaped eye piece 68 put on affording a good rest of the microscope on the border of the eye-socket of the observer.

The described apparatus is loosely encaged within a sheet metal box 69 having a chamber which encloses the film roll but is still large enough for receiving besides all the required accessory parts such as the eye-piece 68, the microscope 28, the socket 65 and the crank 8. Thus the whole apparatus is incased within said sheet metal box. This box has a removable cover not shown, and is fitted slidably into a casing 27 containing a roller 71 adapted to receive the unrolled film band and mounted within said casing on a revolvable axle 72 driven by means of groove wheels 73 and 74 and a resilient rope 75 by the crank 8. The slip of the rope 75 facilitates a good unrolling and uprolling in view of the constantly changing diameters of the unrolling and uprolling film roll. If it is wanted to roll up the band on its original roll the crank 8 is attached to the square 48 on the axle 5 carrying the film roll 6 and the button 62 is pushed upwards so as to disengage the film band from the teeth 50 of the feed wheel 49. While turning the crank 8 the film band is rolled up on roll 6. Instead of providing a casing 27 and an axle for rolling-up the band also a small pedestal carrying a loose roll and mounted on the plates 1 and 2 could be provided for. The axle of this roll would be driven by means of a crank and a resilient rope.

The apparatus could also be fitted up with a revolvable diaphragm. By increasing the diameter of the single toothed wheel 40 the speed of the stepwise movement of the film band may be increased and the shifting of the image be made so sudden thereby that the eye would no more be troubled by any vibrations of the images.

With the arrangement described a pocket-cinematograph has been created which can be sheltered within a box having the dimensions 2 x 4 x 1 inches and which will therefore easily find room in a waistcoat-pocket of the usual dimensions.

What we claim as new is:

1. In a pocket-cinematograph and in combination a number of parallel plates secured together at some distance from each other, an axle revolvably maintained by certain of said plates and adapted to receive a film roll, a mechanism mounted between certain other of said plates and comprising another axle, and a toothed feed wheel for moving the film strip and said film roll stepwise, a lens containing tube arranged at right angles to said first mentioned axle close to and between said first mentioned axle and said mechanism, a hinged guide plate for the film band and having a curved part said plate having also a slot in the curved part for letting pass the teeth of the feed wheel of said mechanism and a hinged tappet behind said guide plate said tappet having a knob adapted to swing the said guide plate so as to disengage the film band from the teeth of the said feed wheel.

2. In a pocket cinematograph, in combination, a roll for receiving a film strip, a lens system, means for moving the film strip past the lens system, a first casing enclosing the said parts, a window in the casing past which the film strip is moved, an opening in the casing for the exit of the film strip moved past a window and a second casing adapted to enclose the first casing and also to form an extension of the first casing in order to receive the unrolled film strip.

3. In a pocket cinematograph, in combination, a roll for receiving a film strip, a lens system, means for moving the film strip past the lens system, a first casing enclosing the said parts, a window in the casing past which the film strip is moved, an opening in the casing for the exit of the film strip moved past the window, a second casing adapted to enclose the first casing and also to form an extension of the first casing, a second rotatable roll in the second casing for winding the unrolled film strip and means for operating the second roll from the means for moving the film strip.

4. In a pocket cinematograph, in combination, a casing, a longitudinal wall which subdivides the casing into two adjacent chambers, an axle arranged in the casing transversely to the longitudinal wall, a roll on this axle for receiving a film strip, an optical chamber closed on all sides and arranged below the roll and transversely to the axle, means provided below the said chamber for the stepwise movement of the film strip past the one end of the chamber, all these parts being arranged in one chamber of the casing, means for operating the means for moving the film strip, a second casing which receives the first casing and also forming an extension of the first casing for the purpose of receiving the unrolled film strip.

5. In a pocket cinematograph, in combination, a casing, an axle rotatably mounted in this casing and adapted to receive a roll with a film band, an opening in a wall of this casing, a lens containing tube arranged behind the said opening and at right angles to the said axle, a plate arranged in the said casing, the one end of this plate being bent so that it forms the said tube, and means for the stepwise movement of the film strip between the said opening and the one end of the said tube.

6. In a pocket cinematograph as claimed in claim 5, a second opening in the wall of the casing opposite the first opening and a tubular light source adapted to be inserted through the said second opening into the lens containing tube.

7. In a pocket cinematograph, in combination, a casing, a film roll in the casing, means for moving the film strip, plates in the casing for supporting the film roll and the said moving means, one of the plates provided with a bent part forming a tube which is located between the film roll and the means for moving the film strip, and a lens system and a light source in the said tube.

In testimony whereof we affix our signatures.

PHILIPPE HAUSER.
EDUARD PROBST.